(12) United States Patent
Draper

(10) Patent No.: US 8,034,231 B2
(45) Date of Patent: Oct. 11, 2011

(54) METHOD FOR REDUCING HYDROGEN SULFIDE EVOLUTION FROM ASPHALT

(75) Inventor: Jennifer D. Draper, Bryan, TX (US)

(73) Assignee: Baker Hughes Incorporated, Houston, TX (US)

( * ) Notice: Subject to any disclaimer, the term of this patent is extended or adjusted under 35 U.S.C. 154(b) by 360 days.

(21) Appl. No.: 12/372,022

(22) Filed: Feb. 17, 2009

(65) Prior Publication Data

US 2009/0206003 A1 Aug. 20, 2009

Related U.S. Application Data

(60) Provisional application No. 61/029,980, filed on Feb. 20, 2008.

(51) Int. Cl.
*C10C 3/00* (2006.01)
*C10G 29/02* (2006.01)
*C10G 29/06* (2006.01)

(52) U.S. Cl. ...................................... 208/39; 208/208 R

(58) Field of Classification Search .................... 208/39, 208/177, 208 R
See application file for complete search history.

(56) References Cited

U.S. PATENT DOCUMENTS

| 3,948,759 | A |   | 4/1976  | King et al.   |         |
|-----------|---|---|---------|---------------|---------|
| 3,960,585 | A | * | 6/1976  | Gaw           | 208/44  |
| 5,000,835 | A | * | 3/1991  | Taylor et al. | 208/39  |
| 5,232,963 | A |   | 8/1993  | Comer et al.  |         |
| 5,266,186 | A |   | 11/1993 | Kaplan        |         |
| 5,276,172 | A |   | 1/1994  | Tate et al.   |         |
| 5,948,243 | A |   | 9/1999  | Kallenbach et al. |     |
| 6,096,837 | A |   | 8/2000  | Palmroos et al. |       |
| 7,329,635 | B2 |  | 2/2008  | Dickakian et al. |      |
| 7,544,239 | B2 | * | 6/2009 | Buras et al.  | 106/284.3 |
| 2005/0261440 | A1 | | 11/2005 | Dickakian et al. |   |
| 2006/0205611 | A1 | | 9/2006  | Sauer         |         |

FOREIGN PATENT DOCUMENTS

EP 244249 A2 11/1987

OTHER PUBLICATIONS

M. A. Sayyadnejad et al.; Removal of Hydrogen Sulfide by Zinc Oxide Nanoparticles in Drilling Fluid, Int. J. Environ. Sci. Tech., 5 (4), Autumn 2008, pp. 565-569.
D. Ferdous et al., "Hydrodenitrogenation and Hydrodesulfurization of Heavy Gas Oil Using NiMo/Al2O3 Catalyst Containing Boron," Ind. Eng. Chem. Res., 2006, 45 (2), pp. 544-552.

* cited by examiner

*Primary Examiner* — Glenn Caldarola
*Assistant Examiner* — Randy Boyer
(74) *Attorney, Agent, or Firm* — Mossman, Kumar & Tyler PC

(57) ABSTRACT

Hydrogen sulfide evolution from asphalt may be reduced or eliminated using an additive to act as a scavenger. Metal borate complexes when used as an additive in asphalt production, are an effective component in preventing or mitigating the evolution of hydrogen sulfide from asphalt.

17 Claims, No Drawings

METHOD FOR REDUCING HYDROGEN SULFIDE EVOLUTION FROM ASPHALT

CROSS-REFERENCE TO RELATED APPLICATIONS

This application claims priority from the U.S. Provisional Patent Application having the Ser. No. 61/029,980 filed Feb. 20, 2008.

BACKGROUND OF THE INVENTION

1. Field of the Invention

This invention relates to asphalt production techniques. This invention particularly relates to asphalt production employing chemical additives.

2. Background of the Art

"Kerogen" is generally defined in the art of hydrocarbon production as a solid, insoluble hydrocarbon that has been converted by natural degradation (e.g., by diagenesis) and that principally contains carbon, hydrogen, nitrogen, oxygen, and sulfur. Coal and oil shale are typical examples of materials that contain kerogens. "Bitumen" is generally defined in the art as a non-crystalline solid or viscous hydrocarbon material that is substantially soluble in carbon disulphide.

"Oil" is generally defined as a fluid containing a complex mixture of condensable hydrocarbons. During a refining process, oil is converted into a number of products. For example, gasoline is one such product and is a mixture of low viscosity and volatile hydrocarbons. Lubricating oil is another hydrocarbon product and has higher viscosity and lower volatility. Heavy fuel oils such as "Bunker C" have even greater viscosity and lower volatility. Materials which are even higher in viscosity and lower in volatility, but not quite a solid such as coke, are often also referred to in the art as bitumen and further include many of the non-hydrocarbon components of oil, including elemental sulfur and sulfur containing compounds.

These bitumen and bitumen like products have a surprising number of uses including but not limited to membranes useful for waterproofing roofs, shingle construction, and road construction.

SUMMARY OF THE INVENTION

In one aspect, the invention is a method of reducing hydrogen sulfide emissions from an asphalt composition, the method including admixing an additive with the asphalt composition wherein the additive comprises a metal borate complex. In some embodiments, the metal borate complex is prepared using, as the metal, Mn, Co, Ni, Fe, Zn, Cu, Cr, and mixtures thereof.

In another aspect, the invention is a composition including asphalt and an additive comprising a metal borate complex.

DETAILED DESCRIPTION OF THE PREFERRED EMBODIMENT

In one embodiment, the invention is a method of reducing hydrogen sulfide emissions from an asphalt composition. For the purposes of this application, the term "asphalt" refers to any of a variety of materials that are solid or semisolid at room temperature and which gradually liquefy when heated, and in which the predominant constituents are naturally occurring bitumens (or kerogens) or which are bitumen like materials obtained as residue in petroleum refining.

Hydrogen sulfide may be present in asphalt as a naturally occurring material, especially in asphalts derived from kerogens. Oil which is heavily contaminated with sulfur, sometimes referred to in the art as sour crude, may also produce bottoms that have "carried over" hydrogen sulfide. Any asphalt which has a sulfur component may spontaneously emit hydrogen sulfide produced by heating the asphalt.

In one embodiment, hydrogen sulfide present in asphalt is "scavenged" using a method including admixing an additive with the asphalt either prior to or concurrent with heating the asphalt. For the purposes of the present application, the term scavenging means that an additive interacts with hydrogen sulfide in asphalt such that gaseous emissions of hydrogen sulfide from the asphalt are mitigated or eliminated.

The additives of the invention include metal borate complexes. The metal borate complexes which may be useful with the invention include those that have metals selected from the group consisting of Mn, Co, Ni, Fe, Zn, Cu, Cr, and mixtures thereof. In some embodiments, the metal is iron; and in other embodiments, the metal is Co, Mg or Ni.

The metal borate complexes may be prepared using both borate compounds and non-borate compounds that may form complexes with Mn, Co, Ni, Fe, Zn, Cu, and Cr. The borate compounds that may be used include compounds that may be converted insitu to borate compounds that are capable of forming complexes. Exemplary borate compounds may include, but are not limited to, sodium tetraborate, boric acid, disodium octaborate tetrahydrate, sodium diborate, ulexite, and colemanite. Combinations of these materials may also be used.

The non-borate complexing compounds include carboxylic acids but may also include other compounds having functional groups that may form complexes with Mn, Co, Ni, Fe, Zn, Cu, and Cr. For the purposes of this disclosure, such compounds are those that have the general formula $R_xA_y$. In this general formula, R is an alkyl group or another organic moiety having from 1 to 30 carbons and no atoms or groups that would prevent the compound from complexing with the subject metals. The A is a complexing functional group which may or may not be terminal and includes carboxylic acid groups, sulfonic acid groups and other groups capable of forming complexes with the subject metals. X and Y are integers and have values necessary to satisfy the valences of the R and A groups.

The metal borate complexes may be made using any method known to be useful in the art of preparing such compositions to be useful. For example, one or more organic acids can be admixed with a metal hydroxide to produce a first admixture which may then be admixed with boric acid to produce such complexes. Other intermediates using differing synthetic paths may also be used so long as the resultant products have a general structure wherein materially all of the resultant composition has a bond or coordination ligand between the boron and the metal. In some embodiments, this is in the form of a "M-O—B" group wherein "M" is a metal, "O" is oxygen and "B" is boron.

U.S. Pat. No. 5,276,172, which is fully incorporated herein by reference, teaches one such synthetic route. In Example 1 of this patent, neodecanoic acid (210 g), propionic acid (147 g) and xylene (300 g) were charged to a reaction flask and heated at 50° C. with mechanical stirring. Cobaltous hydroxide (171 g) was added and the temperature raised to 90° C. with mechanical stirring to produce a mobile blue liquid. Further heat was applied to remove water of reaction via xylene entrainment using a Dean & Stark trap. When the temperature had reached 140° C., benzoic acid (73 g) dissolved in xylene (150 g) was gradually added to the reaction mixture while the water formed was continuously removed. After completion of water removal (65 g), the xylene was removed by short path distillation to a maximum temperature of 155° C. using vacuum to complete the removal. Next, n-Butyl orthoborate (138 g) was added. The reaction mixture was heated to 190° C. and refluxed for three hours. The n-Butyl propionate (220 g) was then distilled off at a maximum temperature of 220° C. with vacuum to complete the ester removal. This synthetic route is offered for exemplary purposes only and should not be considered as limiting the scope of the invention.

The additives may be admixed with an asphalt using any method known to be useful to those of ordinary skill in the art. For example, the additive may be introduced into a vessel and then asphalt introduced into the vessel "on top" of the additive and then mixed using a mechanical mixer. In an alternative embodiment, the additive and asphalt are not mixed using a mechanical mixer but rather are admixed by moving the vessel. In still another embodiment, the additive may be introduced as a feed stream into a bottoms separation process in an oil refinery. The additives may be added to asphalt when it is being stored or transported; for example the additives may be added to a storage tank or the hold of a ship either before, during or after the asphalt is introduced into the hold.

The additive may be introduced into the asphalt at any concentration useful to the intended end result. For example, if complete reduction of hydrogen sulfide is not needed, then the additive may be introduced at a level sufficient to reach a target specification. Those of ordinary skill in the art well know how to determine the appropriate concentration of additive to use to reach a target or specification hydrogen sulfide concentration. Generally though, it may be desirable in some embodiments of the invention to use sufficient additive to introduce from about 250 to 2500 ppm of the additive, iron borate complex, for example, into the asphalt. In other embodiments, the concentration may be from 500 to 2000 ppm. In still other embodiments, the concentration may be from about 1000 to 1500 ppm. Different asphalts and even similar asphalts having differing initial hydrogen sulfide concentrations may require different loadings of the additives of the invention. Asphalts that have been held at high or very high temperatures for an extended amount of time may have high levels of hydrogen sulfide and thus require higher concentrations of additive to be effectively treated using the method of the invention.

The additives of the invention, in some applications, may be most effective when allowed to interact with bitumen over a period of time. For example, once admixed with an asphalt, the additives of the invention may most effectively reduce hydrogen sulfide concentration within the asphalt over the course of a period of from 1 hour to 24 hours.

The additives of the invention may be used at comparatively high temperatures. For example, the additives may be used at temperatures of 425° F. (218° C.) but are also effective at temperatures in the range of 275° F. to 375° F. (135° C. to 190° C.) which is a more commonly used temperature for handling asphalt.

EXAMPLES

The following examples are provided to illustrate the invention. The examples are not intended to limit the scope of the invention and they should not be so interpreted. Amounts are in weight parts or weight percentages unless otherwise indicated.

Examples 1-4 and Comparative Example I

Experiment 1

The additives are introduced into separate clean, one quart (0.95 L), metal cans in the amounts shown below in Table 1. 500 ml of asphalt is introduced into each can and the can is sealed. The sample within each can is maintained at 300° F. (149° C.) using an oven. The additive is admixed with the asphalt by shaking the cans using a shaker table. After 4 hours, the cans are pierced and the hydrogen sulfide concentration in the head space within the can is determined using a Dräger® tube. Results are shown below in Table 1.

Example 1 is an iron borate neodecanoate complex, 75 percent in naphtha, available from OMG Americas under the trade designation EP9785. Example 2 is a cobalt borate neodecanoate complex, 82 percent in naphtha, available from OMG Americas under the trade designation ULTRA-DRI 360D. Example 3 is a manganese borate neodecanoate complex, 68 percent in naphtha, available from OMG Americas under the trade designation ULTRA-SET 248D. Example 4 is a nickel borate neodecanoate complex, 40 percent in organic solvents, available from OMG Americas under the trade designation MANOCAT NBA. Comparative Example I is a condensation product of butyl aldehyde and ethanol amine. It is present at a concentration of 70 percent in kerosene.

TABLE 1

| Sample ID | Additive Concentration ppm | 4 Hours [$H_2S$] ppm | [Metal] Wt % |
|---|---|---|---|
| Example 1 | 1,000 | 20 | 15 Fe |
| Example 2 | 1,000 | Not Detected | 18 Co |
| Example 3 | 1,000 | 220 | 16 Mn |
| Example 4 | 1,000 | 2,000 | 6 Ni |
| Comparative Example I | 1,000 4,000 | 7,000 2,000 | n.a. |
| Control | — | 7,500 | n.a. |

Experiment 2

Experiment 1 is reproduced except that the samples are measured for H2S after 18 hours storage and different dosages are used. The results as shown below in Table 2.

TABLE 2

| Sample ID | Additive Concentration ppm | 18 Hours [$H_2S$] ppm |
|---|---|---|
| Example 1 | 250 | 1,000 |
|  | 500 | 800 |
| Example 2 | 250 | 1,600 |
|  | 500 | 50 |
| Example 3 | 250 | 4,000 |
|  | 500 | 1,700 |
| Example 4 | 500 | 4,000 |
|  | 1,000 | 4,000 |
| Comparative Example I | 1,000 | 6,000 |
|  | 2,000 | 5,000 |
|  | 3,000 | 4,000 |
|  | 4,000 | 2,000 |
| Control | — | 11,000 |

Experiment 3

Experiment 1 is reproduced except that the samples are measured for H2S after 2 hours storage and different dosages are used, no comparative example is provided, and a mixed metal additive is used. The results are displayed below in Table 3.

TABLE 3

| Sample ID | Additive Concentration ppm | 18 Hours [H$_2$S] ppm |
|---|---|---|
| Example 1 | 250 | 3,500 |
|  | 500 | 1,200 |
|  | 750 | 1,000 |
|  | 1,000 | 50 |
|  | 1,500 | 30 |
| Example 2 | 250 | 2,000 |
|  | 500 | 400 |
|  | 750 | 10 |
|  | 1,000 | 70 |
|  | 1,500 | 5 |
| Example 3 | 250 | 3,750 |
|  | 500 | 3,000 |
|  | 750 | 2,000 |
|  | 1,000 | 150 |
|  | 1,500 | 70 |
| Example 1/Example 2 | 750/750 | 10 |
| Control | — | 10,000 |

What is claimed is:

1. A method of reducing hydrogen sulfide emissions from an asphalt composition comprising admixing an additive with the asphalt composition wherein the additive comprises a metal borate complex.

2. The method of claim 1 wherein the metal borate complex is prepared using a metal selected from the group consisting of: Mn, Co, Ni, Fe, Zn, Cu, Cr, and combinations thereof.

3. The method of claim 2 wherein the metal borate complex is prepared using Fe.

4. The method of claim 2 wherein the metal borate complex is prepared using a metal selected from the group consisting of: Mn, Co, and Ni.

5. The method of claim 1 wherein the metal borate complex is prepared using a compound selected from the group consisting of: sodium tetraborate, boric acid, disodium octaborate tetrahydrate, sodium diborate, ulexite, colemanite, and mixtures thereof.

6. The method of claim 1 wherein the metal borate complex is one resulting from an in-situ conversion of a compound that is not a metal borate complex.

7. The method of claim 1 wherein the additive additionally comprises a compound that is not a metal borate that is capable of forming complexes with a metal selected from the group consisting of: Mn, Co, Ni, Fe, Zn, Cu, and Cr.

8. The method of claim 7 wherein the compound that is not a metal borate that is capable of forming complexes with a metal selected from the group consisting of: Mn, Co, Ni, Fe, Zn, Cu, and Cr is one having a general formula:

$$R_xA_y$$

wherein:
R is an alkyl group or another organic moiety having from 1 to 30 carbons and no atoms or groups that would prevent the compound from complexing with a metal selected from the group consisting of Mn, Co, Ni, Fe, Zn, Cu, and Cr; and
A is a complexing functional group.

9. The method of claim 8 wherein A is a carboxylic acid group or a sulfonic acid group.

10. The method of claim 8 wherein A is a terminal group.

11. The method of claim 8 wherein x and y are integers and have values necessary to satisfy valences of R and A.

12. The method of claim 1 wherein the additive is introduced into a vessel and then the asphalt composition is introduced into the vessel on top of the additive and then mixed using a mechanical mixer.

13. The method of claim 1 wherein the additive and the asphalt composition are admixed by moving a vessel containing them.

14. The method of claim 1 wherein the additive is introduced into the asphalt composition at a concentration of from about 250 to 2,500 ppm (w/w).

15. The method of claim 14 wherein the additive is introduced into the asphalt composition at a concentration of from about 500 to 2,000 ppm (w/w).

16. The method of claim 14 wherein the additive is introduced into the asphalt composition at a concentration of from about 100 to 1,500 ppm (w/w).

17. The method of claim 1 wherein the additive and asphalt composition are admixed at a temperature of from about 275° F. to 375° F. (135° C. to 190° C.).

* * * * *